United States Patent [19]
Calltharp

[11] Patent Number: 5,021,161
[45] Date of Patent: Jun. 4, 1991

[54] METHOD FOR THE TREATMENT OF WASTEWATER

[75] Inventor: Glen R. Calltharp, Olathe, Kans.

[73] Assignee: JMO Holding, Inc., Industrial Airport, Kans.

[21] Appl. No.: 481,506

[22] Filed: Feb. 16, 1990

[51] Int. Cl.$^5$ ................................. C02F 3/30
[52] U.S. Cl. ..................... 210/614; 210/629; 210/630; 210/744
[58] Field of Search ............... 210/605, 620, 614, 629, 210/744, 630, 89, 98

[56] References Cited

U.S. PATENT DOCUMENTS

| | | | |
|---|---|---|---|
| 4,645,592 | 2/1987 | Calltharp et al. | 210/142 |
| 4,648,967 | 3/1987 | Calltharp et al. | 210/136 |
| 4,775,467 | 10/1988 | Calltharp et al. | 210/142 |

FOREIGN PATENT DOCUMENTS 63-294996 12/1988 Japan.

Primary Examiner—Ivars Cintins
Assistant Examiner—Christopher Upton
Attorney, Agent, or Firm—Litman, McMahon & Brown

[57] ABSTRACT

A process strategy for the treatment of wastewater in a sequencing batch reactor wherein wastewater in quantities above a preselected minimum amount is proportionally aerated so as to reduce energy usage and operating costs.

6 Claims, 3 Drawing Sheets

METHOD FOR THE TREATMENT OF WASTEWATER

BACKGROUND OF THE INVENTION

The present invention relates to a method for the treatment of wastewater and, in particular, to such a method for use with a system of sequencing batch reactors.

In the early history of wastewater treatment by microorganisms, the wastewater was often batched and treated by various processes of agitation, aeration or the like. With the amount of wastewater to be treated increasing in volume and in impurities, batch treatment became fairly labor intensive and was eventually substantially replaced by continuous wastewater treatment processes in the 1920's and 1930's.

However, with the relatively recent innovation of computers which can be programmed to control valves, motors, etc. in the wastewater treatment process system, batch reactors again appear to be a viable alternative and offer attractive advantages over continuous processes.

A sequencing batch reactor system generally incorporates a series of batch reactors, usually two or three which use a sequence of steps to treat wastewater. Each of these reactors retains a certain amount of activated sludge and allows for the removal of excess sludge. The activated sludge contains microorganisms which assist in the breakdown of waste materials when provided with adequate oxygen levels.

Each reactor in a sequencing batch reactor system operates in a cyclical process. During the cycle for a particular reactor, the reactor must complete the process of treating a batch of wastewater. The batch wastewater treatment process includes a fill period, a react period, a settle period and a decant period. An idle period may also be included in the treatment process.

During the fill period, wastewater is introduced into a batch reactor. The fill period can be further divided into an anoxic fill period and an aerated fill period. During the anoxic fill period, wastewater is introduced into the batch reactor without aeration and during aerated fill, the wastewater already introduced into the batch is aerated while the reactor continues to fill, thereby providing oxygen to the microorganisms in the activated sludge.

At the end of the fill period, incoming wastewater is diverted to another batch reactor which then begins its cycle. The just filled reactor then enters the react period wherein the wastewater contained in the reactor is aerated for a predetermined time period. Aeration of the contents of the batch reactor results in the mixing of the activated sludge and the wastewater as well as the introduction of oxygen into this mixture. The introduction of oxygen into the mixed wastewater and sludge is required by the microorganisms contained in the sludge to effect the decomposition of various wastewater components, including biodegradable organic matter.

In the aeration of batch reactors, a set of pumps is often utilized which recirculates the mixed wastewater and sludge throughout the system and which forces oxygen into the resulting mixture. The use of this pumping system places the greatest energy demands on the system of any step in the batch reactor sequence.

At the end of the predetermined aeration period, the system enters a settle period where quiescent conditions are maintained. These quiescent conditions allow the reactor contents to separate into a clarified effluent layer and a sludge layer. After separation is complete, the sludge layer rests on the bottom of the reactor and the clarified effluent layer is located above the sludge layer. The effluent layer is subdivided into a lower buffer volume and an upper decant volume.

At the end of the settle period, the decant period begins and the decant volume of the clarified effluent is removed from the reactor. The decant volume is normally equal to the volume of influent received during the previous fill period. However, the decant volume and, therefore, the fill volume is limited to a maximum volume based on the dimensions of the reactor. The buffer volume is retained in the reactor during the decant period and provides a buffer zone between the sludge layer and the decant volume to reduce the possibility of sludge uptake during the decanting process.

At the end of the decant period, the reactor typically enters an idle period until each reactor of the system has sequenced through the filling cycle after which wastewater is directed back to that reactor and the reactor begins its cycle again with the fill period.

The length of certain of these steps has been varied for various reasons and, in particular, to respond to varying influent flow rates.

It would be possible to operate a sequencing batch reactor system so that the reactors only treated full batches by having the fill period last until the reactor filled by an amount equal to the normal decant volume. However, this mode of operation would result in extremely long cycles for reactors at low influent flow rates. During these long cycles, reactors which were not being filled would sit idle for extended periods of time. The extended idle periods would be harmful to microorganism populations in the sludge and would result in inefficient use of the reactors. In order to optimize reactor use and maintain microorganism population, conventional operating strategies generally establish a maximum cycle time for the reactors.

Based on the maximum cycle time, the conventional operating strategy is time based with level overrides. Timers are set for the fill period, the anoxic fill period, the aeration period (aerated fill period plus aerated react period) and the settle period. The fill timer is set for a period equal to the maximum cycle time divided by the number of reactors. For example, in a two reactor system having a six hour maximum cycle time, the fill timer for each reactor would be set at three hours. The influent flow rate required to fill the reactor or, more specifically, the maximum decant volume within the time set on the fill timer is the design flow rate. The maximum cycle time is generally picked so that the reactor operates a majority of the time at flow rates near or below the design flow rate.

At flow rates below the design flow rate, the reactor will not fill completely before the fill timer expires, therefore, the reactor is allowed to fill until the fill the next reactor which will begin its fill period. At flow rates above the design flow rate, the reactor will fill completely before the timer expires, triggering a level override. The level override causes the influent flow to be diverted to the next reactor ending the fill period in one reactor and beginning it in the next. In conventional batch reactor systems, at flow rates below the design flow rate, the amount of time allowed for the anoxic fill period, the aerobic fill period, the react period and the settle period remain constant, despite changes in the influent flow rate and the batch size. By maintaining constant aeration times for varying sized batches, conventional operation strategies either unnecessarily waste large amounts of energy by aerating small batches too long, or provide inadequate aeration for larger batches.

At flow rates above the design flow rate, the time available for the non-filling reactors to go through the various wastewater treatment steps becomes a limiting factor in the wastewater treatment strategy. As the influent flow rate increases, the fill time decreases, thereby decreasing the time available for the non-filling reactor(s) to complete all the waste treatment steps.

Because the time required for the settle period and the decant period is generally constant for full batches and the fill period is determined by the influent flow rate, conventional operating strategies generally compensate for the narrowing time constraints by reducing the idle period and then the react period. The react period can be initially reduced without reducing the overall aeration time by providing for an aerated fill period, although this does reduce anoxic time. Then, as the time constraints narrow, the aerated fill period is continually increased and the react period is decreased. This will reduce the anoxic fill period while maintaining a constant aeration time. Eventually, the react period is eliminated and all the aeration takes place during the fill period. The anoxic fill period is consequently eliminated. Elimination of the anoxic fill period and the react period (as opposed to an aerobic fill period) is undesirable. Each of these steps is important for the effective decomposition of waste material by microorganisms contained in activated sludge.

SUMMARY OF THE INVENTION

The present invention relates to a method for the treatment of wastewater in a sequencing batch reactor system and a computer control system used to implement the operating method. The wastewater treatment method of the present invention establishes a maximum cycle time as in conventional operating strategies and thereby establishes a corresponding design flow rate; however, the various steps or stages of the operating cycle of the wastewater treatment method are varied in a non-conventional manner so as to provide significantly improved results over conventional methods. The computer control system monitors and measures the influent flow rate and operably controls the various stages of the operating cycle in accordance with the inventive method.

Where the influent flow rate remains below the design flow rate and the system treats less than full batches, the computer measures the measured batch size during filling and utilizes the size of the batch to determine the required aeration time. In accordance with a major element of the present invention, the aeration time allowed for a less than full batch above a minimal level is proportionally based on the aeration time allowed to treat a full batch.

As the influent flow rate increases towards the design flow rate, the size of the batches correspondingly increase and the aeration time allowed by the computer control system increases proportionally with the batch size. At flow rates above the design flow rate, where the system is treating only full batches, the computer control system operates to maintain a uniform aeration time for the full batches.

OBJECTS OF THE INVENTION

Therefore, the objects of the present invention are: to provide a method for the treatment of wastewater which reduces the energy demands on the system; to provide such a method which optimizes the aeration time; to provide such a method which is easily adaptable to be wholly or partially automated and, in particular, is adapted to computer control; to provide a computer system to control such a method; and to provide such a method which is readily incorporated into batch reactors and is particularly suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
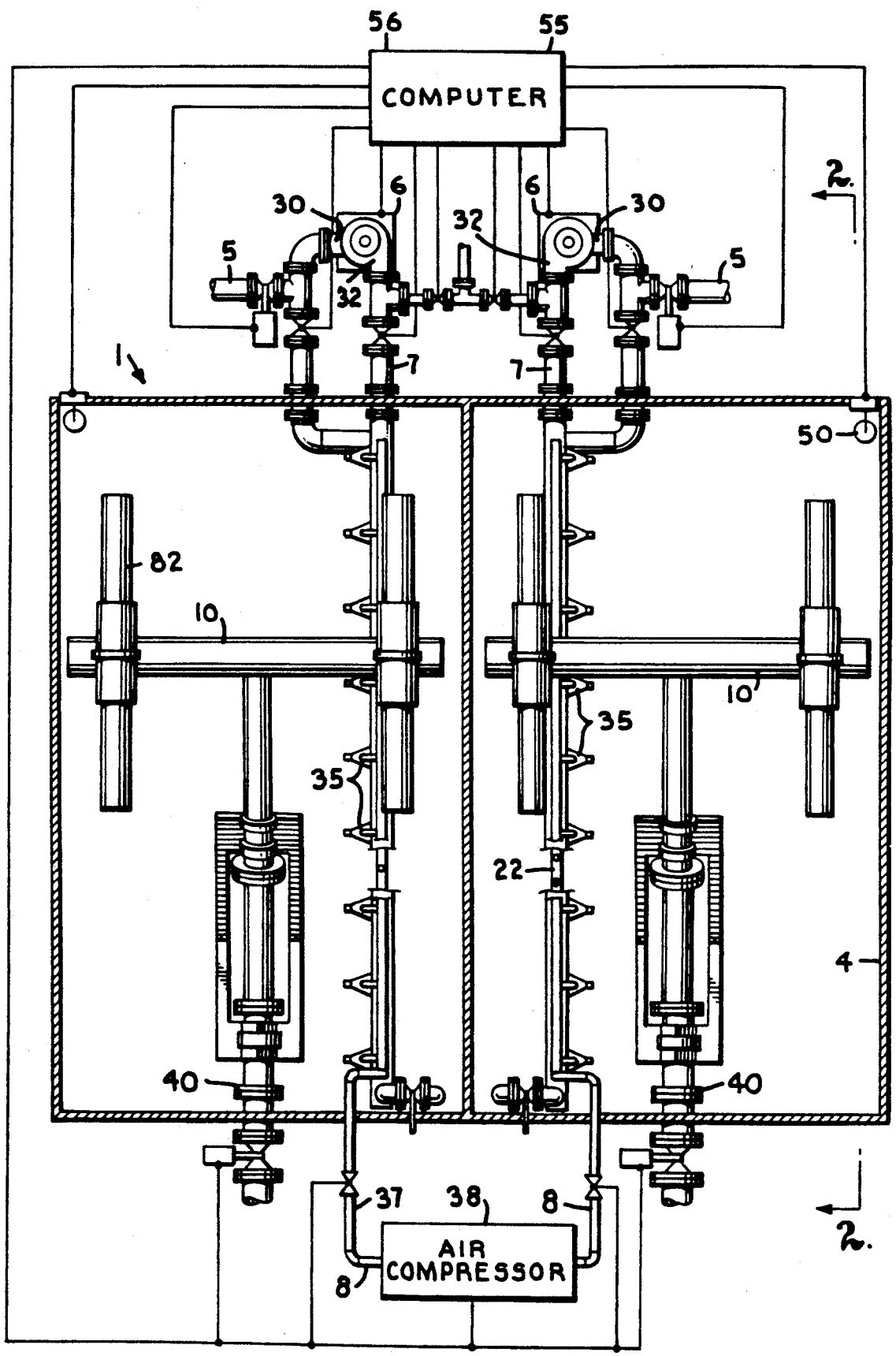
FIG. 1 is a partially schematic top plan view of a sequencing batch reactor basin for performing the process of the invention.
Figure 2:
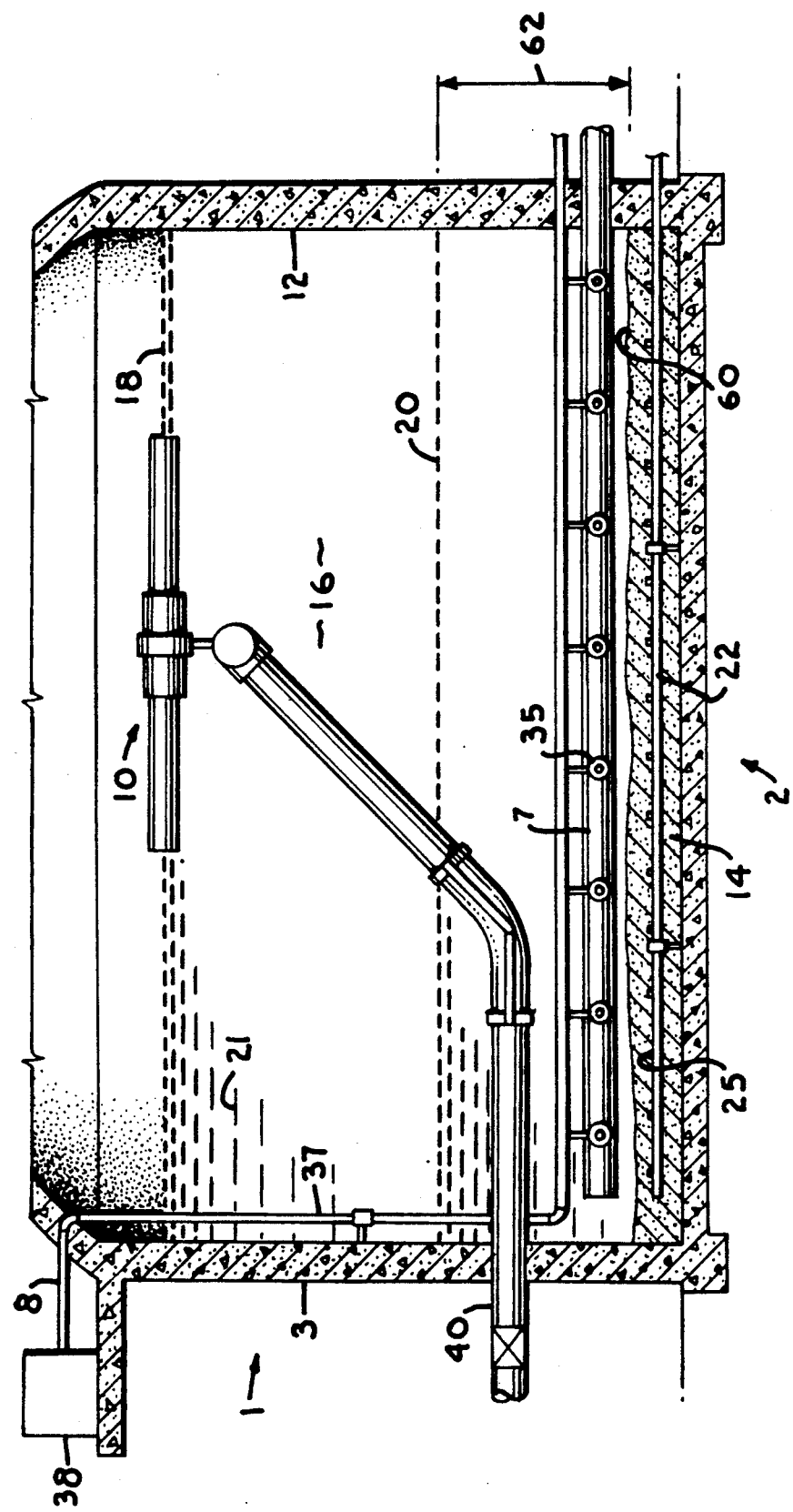
FIG. 2 is an enlarged, fragmentary and partially schematic cross-sectional view of the basin, taken along line 2—2 of FIG. 1.

The process of this invention is effectively utilized with a sequencing batch reactor system (SBR) having two or more reactors, as illustrated in FIGS. 1 and 2. The reference numeral 1 generally represents such a sequencing batch system. The system 1 includes a pair of sequencing batch reactors 2 generally comprising a fluid containing tank, basin, vessel or reservoir 3, an influent manifold 5, pumping means such as illustrated recirculation pump 6 with an associated circulation manifold 7, an aeration system 8 and decanting means such as illustrated decanter 10.

The reservoir 3 has side walls 12, a floor or bottom 14 and holds wastewater fluid 16 to be treated therein. During a treatment cycle, the fluid 16 inside the reservoir 3 may range between a top surface water depth (TSWD) indicated by the reference numeral 18 and a bottom surface water depth (BSWD) indicated by the reference numeral 20.

For each reactor 2, wastewater to be treated enters through filling means such as the influent manifold 5 and is distributed along the bottom 14 of the reactor 2 through a distribution conduit 22 flow connecting with the influent manifold 5 and having a plurality of distribution apertures 25 therealong. The distribution conduit 22 also flow connects with a suction port 30 of the recirculating pump 6 which, in turn, flow connects with the apertures 25.

The circulation manifold 7 extends from and is in flow communication with a discharge port 32 of the recirculating pump 6. A plurality of nozzles 35 extend outward from and in flow communication with the circulation manifold 7. Piping and valving for the recirculation pump 6 may be selectively adjusted so that the pump 6 may draw from the distribution conduit 22 and discharge through the nozzles 35 or draw through the nozzles 35 and discharge through the distribution conduit 22 for cleaning of the nozzles 35, as desired.

A pressurized air manifold 37 is connected to a compressed air source, such as a compressor 38 and with the circulation manifold 7. In this manner, compressed air can be selectively mixed with the wastewater in the circulation manifold 7 such that the wastewater exiting the nozles 35 is highly oxygenated.

The illustrated decanter 10 is of the type described in U.S. Pat. No. 4,648,967 which is incorporated herein by reference and operates to decant clarified wastewater from the TSWD 18 to the BSWD 20. The decanter 10 is in flow communication with a discharge manifold 40, through which decanted wastewater is discharged. Each reactor 2 also includes a level sensing device 50 which communicates with a computer control system 55 including a computer 56. The computer 56 is operatively linked to each of the pumps 6, each process control valve including the valves controlling flow about the pumps 6, aeration system 8, decanters 10, flow and level sensors, including sensors 50. The computer 56 preferably receives operational information from each of these elements and, in turn, operates each of the elements as required to operate the system 1 in accordance with the present invention.

METHOD

Using the reactors 2, wastewater is treated in a cyclical batch process. Each complete cycle preferably includes a fill period, a react period, a settle period and a decant period and may also include an idle period. The fill period may further be broken down into an anoxic fill and an aerobic fill period. To ensure operational efficiency and to maintain healthy microorganism populations in the sludge in the reactors 2, a maximum cycle time for the reactors 2 is established.

The amount of time allowed for the fill period for each reactor 2 operating at the maximum cycle time is the maximum cycle time divided by the number of reactors 2. A design flow rate is then established as the influent flow rate required to fill each reactor 2 during the fill period for the maximum cycle time. The maximum cycle time is preferably selected so that the corresponding design flow rate equals or exceeds the actual influent flow rate for a majority of the time relative to the wastewater flows in the specific area in which the system 1 is to be used.

As discussed previously, the greatest energy demands are placed on the sequencing batch reactor system by aeration of the wastewater, as the wastewater is both agitated by circulation or the like and air is pumped into the water during the aeration period. The operating strategy of the present invention works to optimize aeration time based on influent flow rates and the corresponding batch sizes. The operating strategy generally takes a three pronged approach based on the classification of the influent flow rate as low, average or high.

Initially, a standard is set for the amount of time a full batch should be aerated. At relatively very low flow rates, for example, less than 50% of the design flow rate, the wastewater is aerated for a constant but minimal amount of time. The minimal amount of time allowed for aeration is to ensure that enough oxygen is provided to the microorganisms in the sludge to maintain healthy microorganism populations.

At average flow rates, for example, between 50% and 133% of the design flow rate, the reactor 2 treats half full to full batches. As the flow rate increases to the design flow rate, the batch size also increases. Above the design flow rate, only full batches are treated. In accordance with the present invention, at the average flow rates, the wastewater is aerated for an amount of time proportional to the size of the batch to be treated with full batches being aerated for the predetermined standard time, as opposed to conventional methods wherein the same aeration is provided for all of the batch sizes that fall within the average range. Therefore, in the present method, as the size of the batches to be treated increases in the average range, so does the amount of aeration time.

At high flow rates, for example, above 133% of the design flow rate, an attempt is made to provide as much of the standard aeration time for full batches as possible in the face of ever decreasing available time.

The computer control system 55, receiving feedback from the level sensing devices 50, is used to implement this strategy. A fill timer, an anoxic fill timer and a settle timer are incorporated in the computer control system 55. The fill timer is set for an amount of time equal to the maximum cycle time divided by the number of reactors 2. The anoxic fill timer can be set at a fraction of the fill timer depending on the desired setting for anoxic versus aerated fill. In some applications, there may not be a need for an aerated fill period for flow rates below the design flow rate. The settle timer is set for a constant value based on the required settle time.

At the beginning of a cycle, a layer of sludge 60 rests on the bottom of the reservoir 3 and a layer of clarified effluent or a buffer zone 62 extends from the sludge layer 60 to the BSWD 20. The anoxic fill and fill timers are begun and wastewater is introduced into the reservoir 3 for the period of such times, as set by the computer. Wastewater is introduced into the reservoir 3 through the distribution apertures 25 of the distribution conduit 22 connected to the influent manifold 5. As the reservoir 3 continues to fill, the level sensing devices 50 monitor the level of the wastewater in the reservoir 3.

At flow rates below the design flow rate, the anoxic fill period will continue until the anoxic fill time expires. At this point, the computer control system 55 engages the recirculation pump 6 and the compressor 31. The recirculation pump 6 pulls wastewater and sludge through the distribution apertures 25 in the distribution conduit 22 and then forces the mixed wastewater and sludge out through the nozzles 35 in the circulation manifold 7. The compressor 38 forces oxygen through the pressurized air manifold 37 and into the circulation manifold 7 so that wastewater exiting the nozzles 35 is highly oxygenated and at a relatively high velocity so as to agitate and mix with the remaining wastewater in the respective reactor 2.

If the flow rate remains below the design flow rate, the fill timer expires before the level of wastewater in the reservoir 3 reaches the TSWD 18. When the fill timer expires, the wastewater will be directed towards the next reactor 2 and flow is discontinued to the reactor 2 previously filling. The level sensing device 50 then relays the wastewater level in the just filled reactor 2 to the computer control system 55. The computer control system 55 determines the percentage of a full batch in the reservoir by dividing the depth of the wastewater introduced into the reactor during the fill period by the depth of a full batch. It is foreseen that the computer control system 55 could obtain filling information through other sensing means such as flowmeters or the like to measure directly or indirectly the amount of wastewater in each reactor 2 at the end of each fill cycle.

If the percentage of a full batch is less than 50%, a react timer will be set for the predetermined minimum aeration time minus the aeration time already provided for during aerobic fill, to ensure adequate aeration to maintain healthy microorganism populations. If the percentage of a full batch is between 50% and 100%, the react timer will be set for a period of time equal to the percentage of a full batch multiplied by the standard aeration time for a full batch, minus the aeration time already provided for during aerobic fill. This provides for aeration proportional to the batch size.

When the allotted time on the react timer expires or when the previous reactor 2 in the system 1 begins aerated fill, the computer control system 55 sets the settle timer and stops the recirculation pump 6 and the compressor 38. The contents of the reservoir 3 are allowed to separate under quiescent conditions into an upper clarified effluent layer and a lower sludge layer 60. When the settle timer expires, the decanter 10 is activated and the clarified effluent is decanted down to the BSWD 20. After the reservoir 3 is decanted, the associated reactor 2 sits idle until the influent wastewater is again directed back to that reactor 2. If the influent flow rate does not exceed the design flow rate, this will occur at the end of the maximum cycle time.

At flow rates above the design flow rate but within the average influent flow rate, where the time available for the react period decreases in response to decreasing cycle times, the computer control system 55 ends the anoxic fill period and begins the aerobic fill period earlier to ensure appropriate aeration. The computer control system 55 begins the aerated fill period at a time calculated to allow a total aeration time equal to the standard aeration time for a full batch and to ensure an adequate amount of time is provided for the settle period and the decant period.

At the end of the fill period, the computer control system 55 sets its react timer for an amount of time equal to the standard aeration time for a full batch minus the aeration time already provided in the aerated fill period. If the flow rate remains constant or decreases, the computer control system 55 will cease aeration when the timer expires. However, if the influent flow rate increases, the computer control system will end aeration in the reactor 2 being filled, when the aerated fill period is begun in the then filling reactor 2 to ensure adequate time to settle and decant before the then filling reactor 2 completes its cycle. At the end of the react period, each reactor 2 goes through the settle and decant periods and then begins another cycle.

At high flow rates, continued increases in the aerobic fill period to ensure standard aeration for full batches quickly eliminates an adequate anoxic fill period. Therefore, at high flow rates, the computer control system 55 reduces the total aeration time as the flow rate increases and the cycle time decreases. The operating strategy may incorporate other methods to increase the time available for aeration at high flow rates. For example, the operating strategy may incorporate a filled-decant period. In a filled-decant period, the decant period of one cycle would overlap with the anoxic fill period in the next cycle, thereby reducing the amount of time required for decanting in the first cycle and providing more time in the first cycle for aeration.

EXAMPLE

Figure 3:
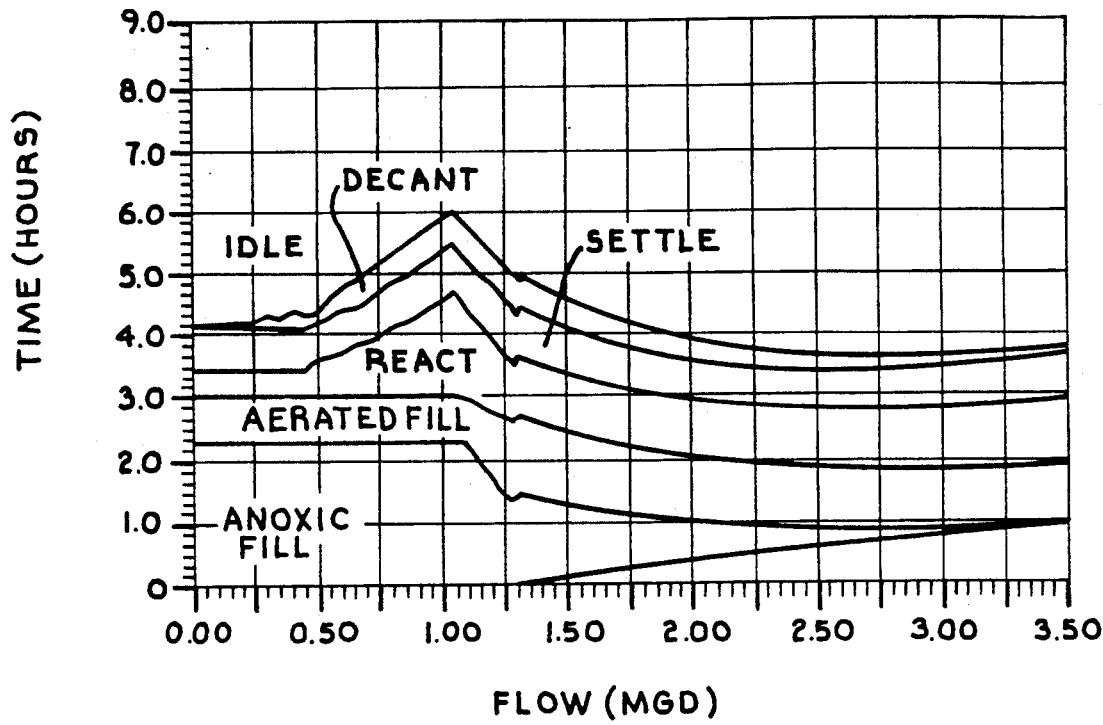
FIG. 3 is a graphical representation of an operating strategy of the present invention for a two reactor sequencing batch reactor system for a municipal wastewater treatment plant having a design flow rate of one million gallons per day.
Figure 4:
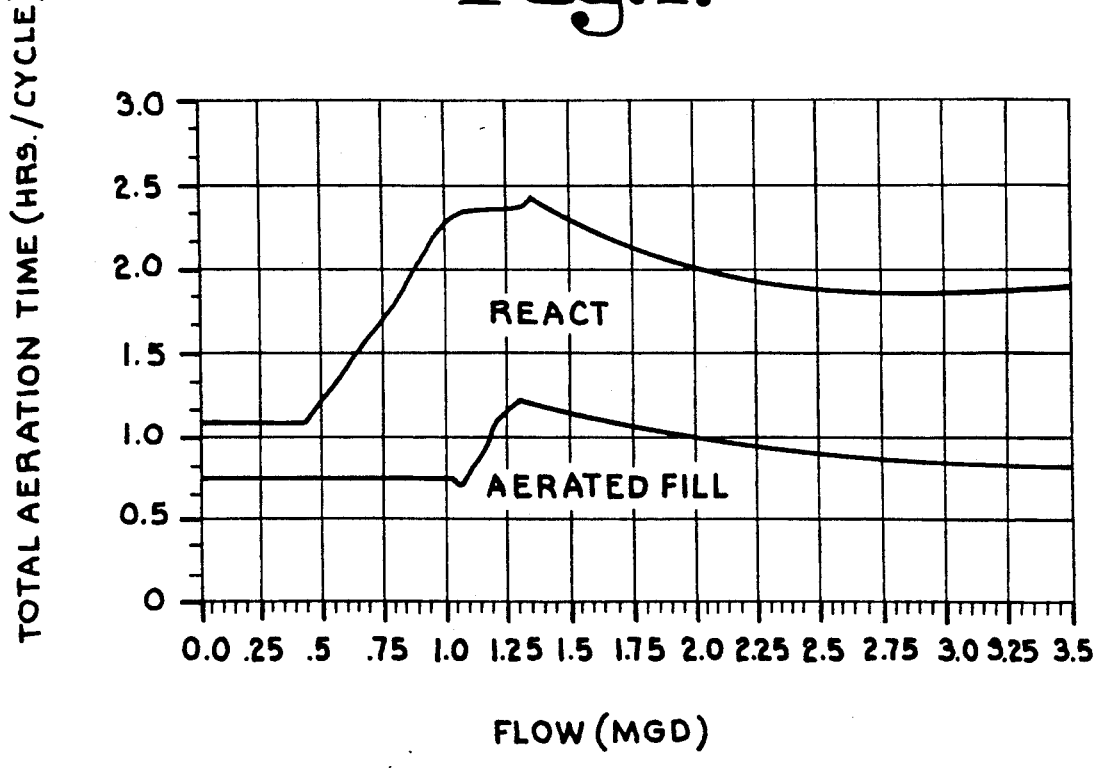
FIG. 4 is a graphical representation of total aeration time versus the influent flow rate for the operating strategy of the present invention, as represented in FIG. 3.

FIG. 3 is a graphical representation of an operating strategy in accordance with the present invention, for a sequencing batch reactor system 1 having a pair of reactors 2 for a typical 1 million gallon per day municipal plant. Each reactor is sized to be 76 feet long and 38 feet wide. The BSWD is 12 feet and the TSWD is 18 feet. A full batch is 129,613 gallons. The maximum cycle time has been set at 6 hours so that the fill timer is set at 3 hours. The corresponding design flow rate is 1.04 MGD which is the flow rate required to fill the reactor in 3 hours. In this example, the low flow rate range extends from 0.0 to about 0.45 MGD, the average flow rate range extends from 0.45 MGD to about 1.33 MGD, and the high flow rate range extends from 1.33 MGD and upward. FIG. 4 is a plot of the total aeration time versus the influent flow rate for this example, showing the overall aeration strategy.

It is to be understood that while certain forms of the present invention have been illustrated and described herein, it is not to be limited to the specific forms or arrangement of parts described and shown.

What is claimed and desired to be secured by Letters Patent is as follows:

1. A method for the treatment of wastewater wherein wastewater is introduced into a batch wastewater treatment system at varying flow rates, said method comprising:
   (a) introducing the wastewater into a batch reactor until the first to occur of either a preselected period expires or the reactor becomes full; said reactor containing an activated sludge and a buffer volume of clarified effluent prior to addition of the wastewater;
   (b) determining the amount of wastewater introduced into the reactor;
   (c) mixing the wastewater with the sludge and aerating the wastewater in the reactor; the wastewater being aerated for a selected period of time generally proportional to the amount by volume of wastewater introduced into the reactor;
   (d) thereafter allowing the aerated wastewater to settle into a layer of clarified effluent and a layer of sludge; and
   (e) decanting a portion of the clarified effluent down to said buffer volume.

2. The method for the treatment of wastewater as described in claim 1 including the step of:
   (a) aerating relatively small batches of wastewater up to a preselected batch size for a minimum amount of time to ensure the viability of microorganism populations in the sludge and aerating a substantial range of batch sizes of wastewater above the preselected size proportional to the size of the batch.

3. The method according to claim 2 including the step of:
   (a) utilizing a process control computer to automatically determine batch size and directly adjust system operation to properly aerate each batch of wastewater.

4. A method for the treatment of wastewater in a system of sequencing batch reactors which sequentially receive influent wastewater for equal predetermined periods or until the previous reactor in sequence becomes full, wherein the wastewater is introduced into the system at varying flow rates, said method utilized in treating wastewater during an operational period when the system is receiving influent wastewater at a flow rate which is equal to or less than the flow rate required to fill an individual batch reactor within the predetermined period, said method comprising:
   (a) introducing wastewater into a batch reactor for the predetermined period, while said reactor contains activated sludge and a buffer volume of clarified effluent;
   (b) determining the amount by volume of wastewater introduced into the batch reactor;
   (c) aerating the wastewater for a selected period proportional to the amount of wastewater introduced into the batch reactor while mixing the wastewater with the sludge;
   (d) thereafter allowing the wastewater to settle into a layer of clarified effluent and a layer of sludge; and
   (e) decanting the clarified effluent down to said buffer volume.

5. The method for the treatment of wastewater as described in claim 4 including the step of:
   (a) providing a minimum amount of time for the aeration of relatively small batches smaller than a preselected batch volume to ensure the viability of microorganism populations in the layer of sludge in the reactor and proportionally aerating a substantial range of batch volumes above said preselected batch volume.

6. A method for the treatment of wastewater in a cyclical process using microorganisms in a system of sequencing batch reactors wherein wastewater is introduced into the reactors in series and at varying flow rates, said method comprising:
   (a) establishing a maximum cycle time in which time a reactor must complete the cyclical process of treating wastewater, said maximum cycle time establishing a maximum fill time equal to said maximum cycle time divided by the number of reactors in series, and a design flow rate of influent wastewater equal to the flow rate required to fill a reactor within said maximum fill time so that at flow rates below said design flow rate, the reactor does not treat full batches and at flow rates above the design flow rate, the reactor treats full batches;
   (b) determining a standard aeration time for which full batches should be aerated;
   (c) determining the time to be provided to allow aerated wastewater to settle into a sludge layer and a clarified effluent layer;
   (d) determining the fractional portions of the maximum fill time that should be allowed for an aerated fill period and a maximum anoxic fill period;
   (e) directing a stream of influent wastewater into a reactor containing a layer of sludge and a buffer volume of clarified effluent; said layer of sludge containing microorganisms to effect the decomposition of wastewater;
   (f) monitoring the level and influent flow rate of the wastewater with a computer;
   (g) beginning aeration after the first to occur of either the maximum anoxic fill period ends or a computed time expires that is calculated to allow a total aeration time equal to said standard aeration time for a full batch plus the time to be provided to allow the aerated wastewater to settle plus the time required to decant the treated wastewater;
   (h) directing the stream of influent wastewater to the next reactor in series at the first to occur of either the end of said maximum fill time or when the reactor being filled becomes full;
   (i) determining with the computer the amount of wastewater just introduced into the reactor as a fraction of a full batch;
   (j) determining a calculated aeration time by multiplying said fraction of a full batch by said standard aeration time;
   (k) aerating said wastewater for said aeration time while mixing said wastewater with the sludge;
   (l) ceasing aeration after the first to occur of either the wastewater has been aerated for said calculated aeration time or when the previous reactor in series begins aeration, but not before a preselected minimum aeration time has elapsed, said minimum aeration time being necessary to maintain viable microorganism populations;
   (m) initiating a settle period wherein quiescent conditions are maintained in the reactor allowing the aerated wastewater to settle into a sludge layer and a clarified effluent layer;
   (n) ceasing said settle period after the time provided to allow the aerated wastewater to settle has expired;
   (o) decanting the clarified effluent layer down to the buffer volume;
   (p) idling the reactor until the stream of influent wastewater is directed back to the reactor from the previous reactor in series; and
   (q) repeating steps (e) through (p) in a cyclical process

* * * * *